United States Patent Office 3,491,031
Patented Jan. 20, 1970

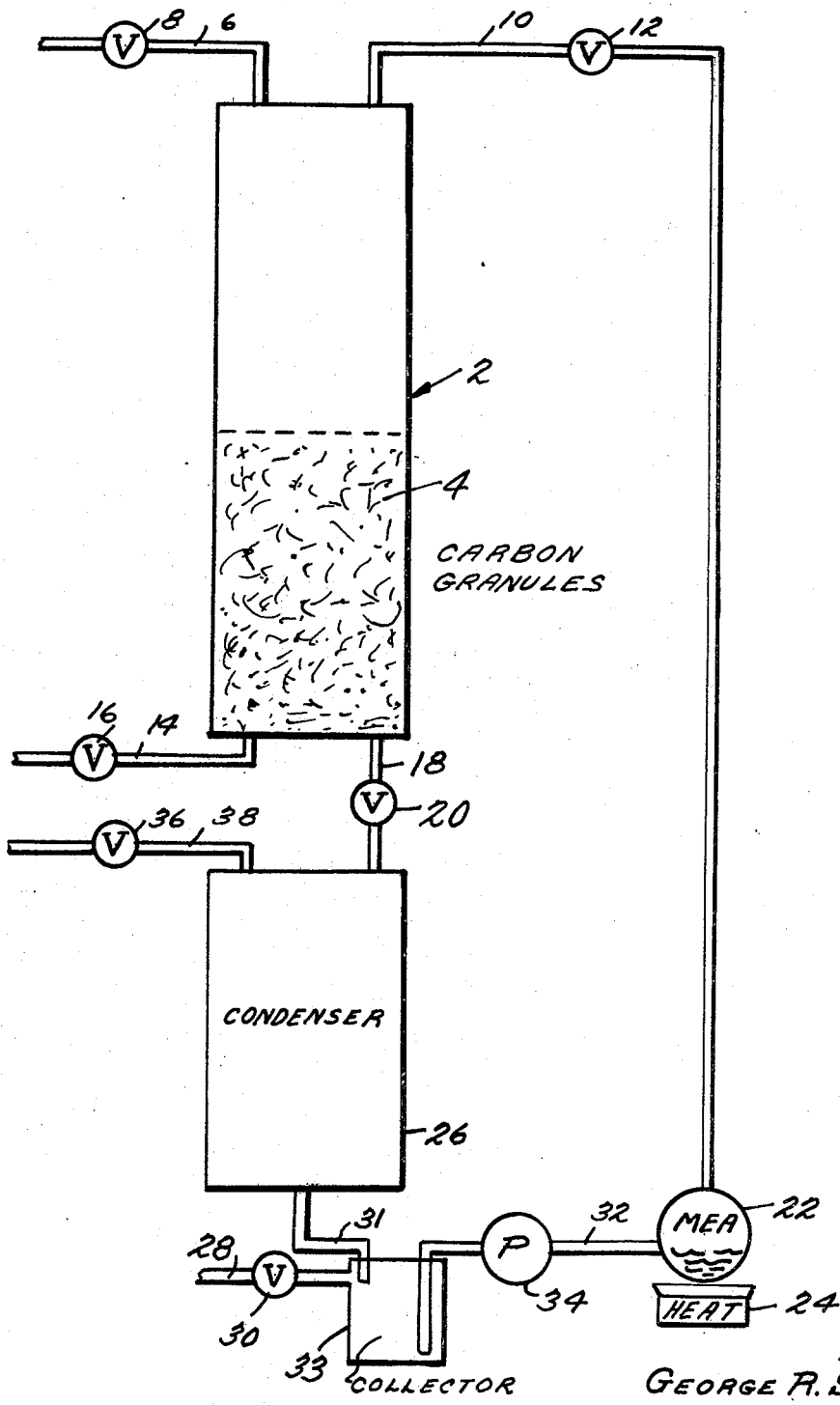

---

3,491,031
REACTIVATION OF MONOETHANOLAMINE IMPREGNATED ACTIVATED CARBON
George R. Stoneburner, Coraopolis, Pa., assignor, by mesne assignments, to Calgon Corporation, a corporation of Delaware
Filed Nov. 18, 1966, Ser. No. 595,416
Int. Cl. B01j 11/02, 1/22
U.S. Cl. 252—411                    6 Claims

---

ABSTRACT OF THE DISCLOSURE

Monoethanolamine impregnated activated carbon is prepared by passing monoethanolamine vapors over activated carbon. Monoethanolamine-impregnated activated carbon which has been used to remove $CO_2$ from non-acidic gases is regenerated by passing monoethanolamine vapors through the exhaust carbon to sweep out the $CO_2$, $CS_2$ and $H_2S$.

---

The present invention relates to monoethanolamine impregnated activated carbon and to its regeneration.

The use of monoethanolamine (MEA) to impregnate activated carbon has been proposed by Manes in application Ser. No. 595,346 entitled "Monoethanolamine Impregnated Activated Carbon and Uses Thereof" and filed on even date. The impregnated activated carbon is useful for removing carbon dioxide and other acidic gases such as nitrogen dioxide, sulfur dioxide, hydrogen sulfide, hydrogen cyanide, sulfur trioxide and $CS_2$ and phosgene from inert gases such as flue gas, natural gas, coke oven gas, air, nitrogen, hydrocarbon gases such as ethane, propane or olefins, e.g. ethylene and propylene. Unfortunately the life cycle of the impregnated activated carbon has proven too short. Thus soaking the activated carbon in monoethanolamine in water and drying at a low temperature, e.g. 80° C. gives a product having a poor life span for $CO_2$ removal from ethylene. Furthermore heating in steam and drying in air at 110° C. in an electric drier also gives a product with a poor life cycle. A better method for impregnating the activated carbon is to use either a dry (i.e. anhydrous) spray or a wet spray (i.e. or containing water) of MEA to impregnate the carbon. This method has the disadvantage that some of the MEA is lost to the atmosphere due to the vapor pressure of MEA. Additionally the life cycle for use in removing $CO_2$ from ethylene, for example, is not as long as desired. Also the capacity for $CO_2$ is not as large as desired.

Monoethanolamine (MEA) impregnated activated carbon is sufficiently expensive that it is desirable to regenerate the exhausted product for further use. When attempts were made to regenerate MEA impregnated activated carbon which had been used to remove $CO_2$ from ethylene gas it was found that despite the fact that MEA boils at 171° C. the MEA impregnated activated carbon could not be regenerated by heating alone or in the presence of inert gases at temperatures above 80° C. because the MEA decomposed. Even at the lower temperatures the regeneration was only 50% at best for the first regeneration and this goes down on a second regeneration. In the presence of water regeneration at temperatures above 80° C. is possible but there is still considerable loss of MEA.

It is an object of the present invention to devise an improved method for impregnating activated carbon with monoethanolamine.

Another object is to devise a method of regenerating monoethanolamine impregnated activated carbon.

A more specific object is to regenerate monoethanolamine impregnated activated carbon which has been used for $CO_2$ removal.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that activated carbon can be successfully impregnated with monoethanolamine by passing the MEA in vapor form through the activated carbon. The amount of MEA adsorbed can be 1 to 50% of the total of MEA and carbon. Usually the MEA is from 5 to 50% and preferably is 18 to 35%.

In the present specification the percent of monoethanolamine (MEA) is based on the total of the carbon and MEA. Also unless otherwise indicated all parts and percentages in the specification are by weight.

It has been found that the capacity for $CO_2$ of MEA impregnated activated carbon prepared by the vapor phase impregnation process is considerably superior to that obtained when the activated carbon is impregnated with MEA by either the dry or wet soak procedure or the dry or wet spray procedure.

The activated carbon employed is granular so that it is effective as a support for the MEA. The particle size of the carbon can be from 4 to 325 mesh (U.S. Sieve series). The activated carbon employed in the following examples was Pittsburgh Type BPL 12 x 30 mesh.

The monoethanolamine impregnated activated carbon can be used to remove carbon dioxide from ethylene at pressures from atmospheric up to 225 p.s.i.g. and higher. The pressure is not critical. The MEA impregnated activated carbon can be used to remove $CO_2$ present in an amount of 5 p.p.m. to 200,000 p.p.m. based on the total volume of gas treated.

The MEA impregnated activated carbon of the invention can be used as previously indicated to remove carbon dioxide from other gases, e.g. nitrogen, air, propylene and other olefins, saturated hydrocarbons such as methane, ethane and propane, flue gas, natural gas or coke oven gas. It also can be used to remove acidic gases such as nitrogen dioxide, sulfur dioxide, sulfur trioxide, hydrogen sulfide, hydrogen cyanide, carbon monoxide, $CS_2$ and phosgene from these and other non-acidic gases.

The bed depth for the MEA impregnated activated carbon is not particularly critical. Above a bed depth of 6 inches the capacity for $CO_2$ adsorption increases linearly. Preferably the bed depth is at least 3 inches although it can be 1.5 inches or less with some sacrifice of efficiency at a linear gas velocity of 20 ft./min.

In the other aspect of the present invention monoethanolamine-impregnated activated carbon bed which has been used to adsorb $CO_2$, $CS_2$ or $H_2S$ is regenerated by passing MEA vapors through the exhausted bed to remove the carbon dioxide, $CS_2$ or $H_2S$. The MEA vapors condense to some extent on the carbon and are allowed to drip out of the bed. To avoid too much MEA in the bed after the regeneration it is desirable to pass some inert gas through the activated carbon bed while it is still hot. The inert gas clears out the MEA vapors before they condense. Thus there can be used nitrogen, helium, ethylene, propylene and other hydrocarbons etc. Thus in the removal of $CO_2$ from ethylene it is convenient to use ethylene gas for the clearing up of the regenerated MEA-impregnated activated carbon. The ethylene thus employed can then be recycled to make sure that all of the $CO_2$ is removed from it.

The regeneration can be carried on in batch or continuous fashion. The $CO_2$ that comes off when the spent bed is regenerated with MEA vapor can be separated from the MEA vapor by condensing the latter and allowing the MEA vapor to collect between the condenser and the still in which the MEA is heated to provide vapor. The $CO_2$ gas can be allowed to come off as vapor at this point and is either allowed to go off to the atmosphere or collected in any convenient container.

In the overall cycle two MEA impregnated activated carbon beds are used. One bed is down, i.e. in the regeneration portion of the cycle while the other bed is on stream, i.e. is picking up $CO_2$ from the gas being purified.

The single figure of the drawing is a diagrammatic illustration of the preferred overall process of the invention.

Referring more specifically to the drawing, there is provided a carbon dioxide removal chamber 2 which is partially filled with activated carbon granules 4. Attached to the top of chamber 2 are line 6 containing valve 8 and line 10 containing valve 12, while line 14 containing valve 16 and line 18 containing valve 20 are attached to the bottom of the chamber 2. Line 10 connects chamber 2 with monoethanolamine boiler 22 which is heated by a convenient heat source 24. Line 18 connects chamber 2 with condenser 26. There is attached to the bottom of the condenser line 31 which passes into collection vessel 33. Line 32 passes from collection vessel 33 via pump 34 to the boiler 22. Line 28 containing valve 30 also is connected to the top of vessel 33.

When it is desired to impregnate the activated carbon granules 4 with MEA valves 8 and 16 are closed, valves 12, 20 and 30 are opened. Heat is applied to boiler 22 to cause the MEA to boil and vaporize. The vapors pass via line 10 to chamber 2 and the activated carbon granules are impregnated with the MEA. Any vapors which are not retained go via line 18 to condenser 26 where they condense to liquid MEA. This liquid is then introduced via line 31 to collection vessel 33. The liquid can then be pumped via line 32 with the aid of pump 34 into the boiler 22. Preferably, the MEA liquid is purified by refluxing prior to being returned to the boiler.

(While the drawing shows the impregnation of the carbon by downward flow of the MEA vapors, the impregnation can also be accomplished by upward flow of such vapors.)

When the carbon particles have been impregnated with a sufficient amount of MEA, the heat is turned off and valve 12 is closed and an inert gas, i.e., nitrogen is passed through the still hot carbon bed to clear out the MEA vapor before the condenser. The gas can pass through line 28 and valve 30 either to the atmosphere or to an appropriate reservoir. Valves 20 and 30 are closed and valves 8 and 16 are opened. Gas to be purified, e.g., ethylene gas containing $CO_2$ is introduced through line 6 and valve 8 to the MEA impregnated activated carbon bed where the $CO_2$ is removed. The purified gas, e.g., ethylene passes via line 14 and valve 16 to any convenient reservoir. After the MEA-carbon bed is saturated with $CO_2$ it is regenerated by closing valves 8 and 16 and opening valves 12, 20 and 30. MEA vapors then flow via line 10 to the MEA-impregnated carbon bed and are condensed to liquid in condenser 26. A certain portion of the MEA vapor condenses on the carbon and is allowed to drip out of the bottom into the condenser. The $CO_2$ liberated from the MEA-carbon bed passes through the condenser to MEA liquid collector 33. The carbon dioxide is boiled off through line 28 and valve 30 and can be collected in any convenient trap (not shown) e.g. in a lime water trap.

When regeneration is complete valve 8 is open and valve 12 is closed and inert gas, e.g. nitrogen or ethylene is passed through the still hot carbon bed to insure that there is not too much MEA present. The MEA vapor is thus cleared out before the condenser. The inert gas is then removed through line 28 and valve 30. In the event ethylene is used for this clearing up it can be recycled to the bed when it is again on-stream for $CO_2$ removal.

In the event that condenser 26 is set up as a reflux condenser, line 31, collector 33, line 28 and valve 30 can be eliminated. In such case valve 36 and line 38 can be used in the regeneration step for the removal of the $CO_2$ from the condensed MEA. In this case line 32 is connected directly to the bottom of the condenser.

EXAMPLE 1

A sample of Pittsburgh type BPL 12 x 30 mesh activated carbon was dry sprayed with CP grade monoethanolamine to produce sample (a) which contained 27.5% of MEA. Another sample of the activated carbon was impregnated with MEA vapor in the manner set forth supra to produce sample (b) which also contained 27.5% of MEA. Samples (a) and (b) were made up into beds having a depth of 6 inches each. Sample (a) had a weight of 16.3 grams while sample (b) had a weight of 15.1 grams. Ethylene gas containing 270 p.p.m. (by volume) of carbon dioxide at a pressure of 225 p.s.i.g. was passed over the beds at a rate of 15 liters per minute at room temperature. The effluent was tested for percent carbon dioxide breakthrough. The results are set forth in Table 1.

TABLE 1

[Sample (a)]

| Time (min.) | Liters | Percent breakthrough |
|---|---|---|
| 1 | 15 | 0 |
| 7 | 105 | 0 |
| 13 | 195 | 0 |
| 19 | 285 | 0 |
| 25 | 375 | 0 |
| 37 | 555 | 0 |
| 43 | 645 | 0 |
| 52 | 780 | 0 |
| 64 | 960 | 0 |
| 80 | 1,200 | 0 |
| 108 | 1,620 | 48.4 |
| 114 | 1,710 | 58.5 |
| 125 | 1,875 | 70.3 |
| 133 | 1,995 | 71.4 |
| 141 | 2,115 | 78.1 |
| 156 | 2,340 | 83.3 |
| 165 | 2,475 | 89.5 |
| 178 | 2,670 | 91.6 |
| 197 | 2,955 | 96.3 |
| 210 | 3,150 | 97.3 |

[Sample (b)]

| Time (min.) | Liters | Percent breakthrough |
|---|---|---|
| 2 | 30 | 0 |
| 20 | 300 | 0 |
| 37 | 555 | 0 |
| 53 | 795 | 0 |
| 60 | 900 | 0 |
| 75 | 1,125 | 0 |
| 83 | 1,245 | 0 |
| 90 | 1,350 | 0 |
| 97 | 1,455 | 0 |
| 110 | 1,650 | 0 |
| 122 | 1,830 | 0 |
| 128 | 1,920 | 1.5 |
| 135 | 2,025 | 4.5 |
| 141 | 2,115 | 9.9 |
| 148 | 2,220 | 18.3 |
| 157 | 2,355 | 61.6 |

It can be seen from Table 1 that the impregnation with MEA vapors (sample (b)) gave an activated carbon which was much more effective for $CO_2$ removal than an activated carbon dry sprayed with MEA in liquid droplet form (sample (a)).

Using the regeneration technique described in connection with FIGURE 1 sample (b) was fully regenerated repeatedly by passing MEA vapors over the spent bed to remove $CO_2$ therefrom.

On the other hand when sample (a) was regenerated it started to show breakthrough after 19 minutes (285 liters of test gas) and had 69.6% breakthrough after 36 minutes (465 liters). On the second regeneration sample (a) showed 100% breakthrough with less than 100 liters of ethylene. On the other hand as indicated sample (b) showed no decrease in $CO_2$ capacity after two regenerations.

EXAMPLE 2

Pittsburgh type BPL 12 x 30 mesh activated carbon was impregnated with MEA by the dry spray method to obtain an impregnated carbon having 14.9% MEA (sample (c)). This was made into a bed 5 cm. deep and nitrogen containing carbon dioxide was flowed therethrough at a flow rate of 3 liters/min. (approximately 1 liter/sq. cm./min.). There were 20 ml. of $CO_2$ in each 3 liters of gas. The impregnated carbon removed all the $CO_2$ for 8 minutes. Sample (c) was then regenerated in an oven at 150° C. for 30 minutes and again placed on stream. It removed the carbon dioxide for only 1.5 minutes.

Sample (d) was prepared in the same manner as sample (c) except that sample (d) contained 27.5% of MEA. In the initial run it removed $CO_2$ for 11.75 min. Upon regeneration of exhausted sample (d) in an oven at 150° C. it was found that the sample when put on stream again broke down in less than one minute.

When an attempt was made to reactivate another portion of sample (d) in a nitrogen stream there also was no activity for the second cycle. The odor given off in all cases was a peculiar one indicating decomposition of the monoethanolamine.

EXAMPLE 3

The procedure of Example 2 was repeated except instead of using a dry spray impregnation the granular activated carbon was impregnated by downward flow of MEA vapors obtained by boiling MEA. After sufficient MEA had been adsorbed the flow of MEA vapors was stopped and nitrogen was passed through the bed at a flow rate of 3 liters/min. until the carbon fed was cooled to room temperature. This product, which was sample (e), contained 28.7% MEA.

The $CO_2$ containing nitrogen stream described in Example 2 was passed through the 5 cm. deep sample (e). It ran for 28 minutes to break.

The exhausted carbon was regenerated by passing MEA vapor downwardly through the bed. Some liquid MEA dripped out due to condensation on the tube walls and carbon. Sample (e) was then blown with nitrogen gas to room temperature. The regenerated MEA impregnated activated carbon was then put on stream again with the nitrogen-$CO_2$ mixture. The regenerated sample (e) gave an exactly 28 minute service time, the same as the original sample (e).

The process of putting sample (e) on stream and rejuvenating was repeated through 4 adsorption and 3 regeneration cycles without any significant loss in the carbon's ability to pick up carbon dioxide.

For best results it has been found that the MEA condensed as shown in the drawings should be refluxed to remove $CO_2$ prior to its being recycled.

Desirably the carbon is heated during the initial blow down period to remove excess MEA. By this procedure of controlling the carbon temperature the carbon-MEA product can contain 20% or less of MEA with effective properties for removal of $CO_2$. While the present invention has been illustrated by regeneration of MEA saturated with $CO_2$ it is also effective with regeneration of MEA saturated with $CS_2$, or $H_2S$.

What is claimed is:

1. A method of regenerating monoethanolamine impregnated activated carbon and at least partially saturated with a member of the group consisting of $CS_2$, $H_2S$ and $CO_2$ comprising passing vapors of monoethanolamine through the carbon containing the $CO_2$, $CS_2$ or $H_2S$ member.

2. A method according to claim 1 wherein the carbon which is regenerated is one which has been impregnated with vapors of monoethanolamine.

3. A method according to claim 1 wherein said member is $CO_2$.

4. A method according to claim 3 wherein after passing through the impregnated activated carbon the $CO_2$ in the monoethanolamine vapors is separated from the monoethanolamine.

5. A process according to claim 3 wherein after the impregnated carbon is regenerated there is passed an inert gas through the carbon to flush out excess monoethanolamine therefrom.

6. A method according to claim 3 including the step of condensing the monoethanolamine vapors after they pass through the impregnated carbon to form liquid monoethanolamine and separating the carbon dioxide in vapor form from the liquid monoethanolamine.

References Cited

UNITED STATES PATENTS

| Re. 18,958 | 9/1933 | Bottoms | 23—2 |
| 2,464,532 | 3/1949 | Sellers | 252—419 |
| 2,778,715 | 1/1957 | Austin | 252—444 |
| 2,815,760 | 12/1957 | Schreus et al. | 252—444 |
| 2,818,323 | 12/1957 | Haensel | 252—428 |
| 3,391,988 | 7/1968 | Friess | 23—2 |

DANIEL E. WYMAN, Primary Examiner

P. E. KONOPKA, Assistant Examiner

U.S. Cl. X.R.

23—2; 252—414, 428, 444